Dec. 11, 1928.
L. B. HARRIS
APPARATUS FOR POWER TRANSMISSION
Filed June 26, 1926
1,694,938
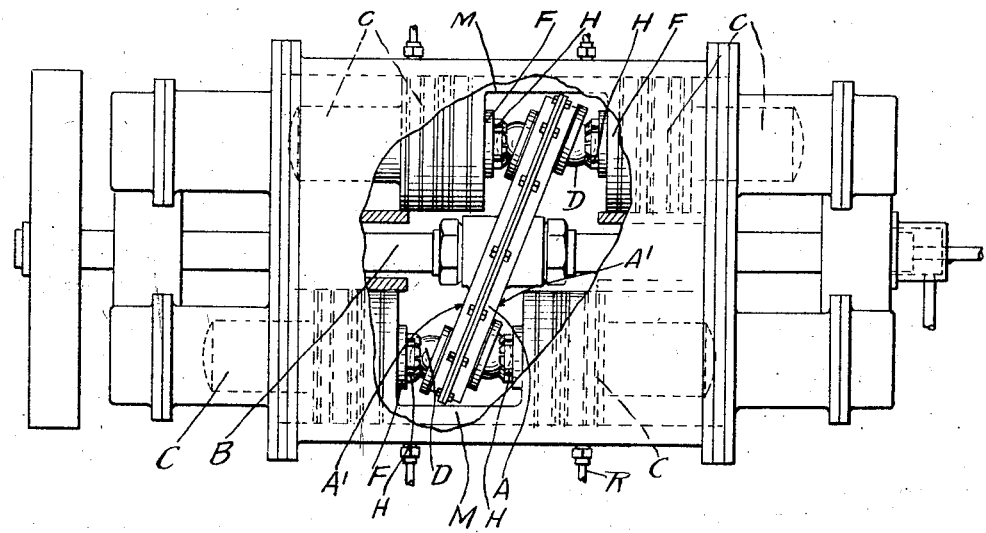
Fig. 1.
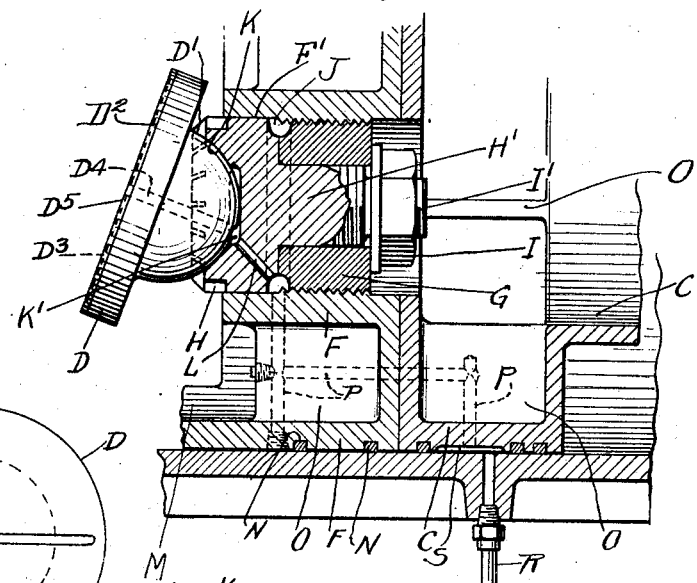
Fig. 2.
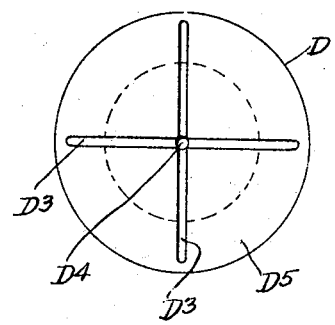
Fig. 3.
Fig. 4.
INVENTOR
Leonard B Harris.
BY
ATTORNEY Patented Dec. 11, 1928.

1,694,938

UNITED STATES PATENT OFFICE.

LEONARD B. HARRIS, OF NEW YORK, N. Y.

APPARATUS FOR POWER TRANSMISSION.

Application filed June 26, 1926. Serial No. 118,749.

My invention relates to engines and machines in which a slant plate or wobble-plate is used in place of a crank to drive the shaft on which it is mounted or thru which the shaft on which it is mounted is driven.

The object of my invention is to provide an improved slipper or shoe construction and means whereby said slipper and wobble-plate may be lubricated by a lubricant under pressure to reduce the friction and prevent undue heating. When used with an engine of the character shown my invention may also be utilized to lubricate the pistons of the engine if desired.

Referring to the drawings which form a part of this specification,

Fig. 1 is a plan view of a portion of an engine of the wobble-plate type in which my invention is illustrated.

Fig. 2 is a longitudinal sectional view thru the plug and sleeve construction, and a slipper supported in the socket formed in one end of the plug.

Fig. 3 is a face view of the slipper.

Fig. 4 is a face view of the socket end of the plug.

—A— indicates a disc shaped plate known as a slant-plate or wobble-plate, and is mounted on the main shaft —B— of the engine and is provided with a plane surface —A'— on each side thereof and parallel to each other. The plate is set at an angle of twenty two and one half degrees to the axis of the shaft —B— or at any other angle suitable for the purpose of the work to be performed.

A yoke piston F—F respectively is located at each side of the wobble-plate and connected by a yoke —M—, and each yoke piston is coupled to a piston —C— in the present case.

A threaded sleeve —G— is screwed into the back end of the bore —F'— which bore is threaded to receive it as illustrated. A socket-plug —H— is secured to the sleeve as shown and is provided with a socket —K— hemispherical in shape at one end, and with a shank —H'— at the other, the shank being secured to the threaded sleeve by a nut —I— which engages the threaded portion of the shank as indicated at —I'—. The outer surface —H'— of the plug —H— is fitted closely into the smooth part of the bore —F'— and a groove —J— is formed between the sleeve and plug, which groove is in open communication with a source of suitable lubricant under pressure. The socket —K— is provided with a groove —K'— which is at all times in open communication with the annular oil groove —J— by way of the passage —L— formed in the plug. The slipper —D— is provided with a hemi-spherical surface —D'— on one side thereof which fits into the socket —K— of the plug, and its opposite side is formed with a plane surface having grooves therein to receive a facing of Babbitt-metal —D²— which is provided with a face —D⁵— which bears against the plane surface of the wobble-plate in the act of driving the latter. Oil channels —D³— extend radially from the oil passage —D⁴— to the groove —K'—.

In illustrating my invention I have shown an oil engine construction having cylinders arranged in pairs, the cylinders of each pair being in axial alignment and one of each being located at each side of the wobble-plate and connected by the yoke —M—. As the pistons are reciprocated the slippers bear against the smooth surfaces —A'— and rotate said plate, as well understood by those skilled in this art.

The pistons are provided with piston rings —N—, and with longitudinally extending ribs —O—O— etc. in which are drilled oil passages —P—P—P— respectively which establish communication between the passage —J— and pipe —R—, and thru which lubricant under pressure is forced from the source of supply to lubricate the face of the slipper and wobble-plate and also the socket bearings, and also if desired to lubricate the pistons by forming annular grooves —S— in the pistons between the rings instead of forming a longitudinal groove only at —S—, as will be readily understood.

By means of the adjustable feature of the sleeve —G— the slippers can be adjusted to perfectly embrace the wobble-plate. The slipper is free to turn in its socket as the wobble-plate is rotated, which it does due to the fact that there is somewhat more friction generated near the outer periphery of the wobble-plate than there is in the smaller radius of travel nearer to the centre of the plate, and by permitting the slipper to turn in its socket the friction is reduced and the the wear between the surfaces is reduced and the lubrication is more evenly distributed.

By this construction and method of lubrication both the face and socket of the slipper is perfectly lubricated, and by using a sufficiently high pressure the surfaces between the face of the slipper and wobble-plate may be forced far enough apart to cause the parts to "float" on the oil between the surfaces and thus reduce the friction to a minimum.

It is obvious that the main shaft may be rotated and thus cause the wobble-plate to serve as a driving element if desired in certain machines where that is required, and that my invention may be incorporated so long as a reciprocating rod is employed thru which the lubricant may be conducted from a source of supply under pressure to the face of the slipper.

Having thus described my invention I claim as new and desire to secure by Letters Patent:

1. A power transmission device comprising a shaft; a wobble-plate carried thereby; a freely rotatable slipper bearing against the wobble-plate, and means for conducting a lubricant thru said slipper to said wobble plate.

2. A power transmission device comprising a shaft; a wobble-plate carried thereby; a freely rotatable slipper bearing against the wobble-plate, said slipper having a hemi-spherically shaped bearing surface on one side thereof; a plug having a socket in which said bearing surface rests, said plug and slipper each having a conduit thru which a lubricant may flow to the bearing surfaces of the socket and slipper.

3. A power transmission device comprising a shaft; a wobble-plate carried thereby; a slipper bearing against the wobble-plate, said slipper having a hemi-spherically shaped bearing surface on one side thereof; a plug having a socket in which said bearing surface rests, said slipper being free to rotate in said socket, said plug and slipper each having a conduit thru which a lubricant may flow to the bearing surfaces of the socket and slipper.

4. An engine having power transmission parts comprising two oppositely disposed pistons yoked together; a main shaft extending parallel with the stroke of said pistons; a wobble-plate mounted on said shaft and extending between said pistons; a plug carried by each piston having a passage for oil extending therethru; a slipper carried by each plug and having an oil passage leading to the face thereof and in open communication with the passage in the plug, said slippers contacting with the plane surfaces of said wobble-plate, and said pistons each having a conduit for oil in open communication with the passages in the plug and slippers, and means for supplying oil under pressure thru said passages to the face of each slipper.

5. A power transmission apparatus comprising a cylinder having a passage for oil formed in the wall thereof; a piston in said cylinder having a passage for oil arranged to communicate with the passage in the cylinder; a plug carried by said piston having a socket formed in its outer end and an oil groove formed in its surface which communicates with the oil passage in the piston; a slipper having a bearing surface which rests in said socket and a plane surface formed on its opposite side which has an oil passage leading from the groove in the socket to the plane surface; a shaft; a wobble-plate on said shaft having a plane surface formed on its side against which the plane surface of the slipper rests and which may be lubricated by oil conducted thru said oil passages.

6. A power transmission apparatus comprising a cylinder having a passage for oil formed in the wall thereof; a piston having an annular groove in its surface adapted to register with the oil passage in the cylinder and having a longitudinally extending passage leading therefrom; a plug carried by the piston and having a passage communicating with the passage in the piston, said plug having a socket formed in its outer end and an oil groove formed in its surface which is at all times in open communication with the passage in the plug; a slipper having a bearing surface which rests in said socket and a plane surface formed on its opposite side which has an oil passage leading from the groove in the socket to the plane surface; a shaft; a wobble-plate on said shaft having a plane surface formed on its side against which the plane surface of the slipper bears, and means for supplying a lubricant under pressure thru said passages to the surface of said wobble-plate.

7. A power transmission device comprising a shaft; a wobble plate carried thereby, a rotatable slipper having a plane surface on one side thereof and a spherical surface on the opposite side and a passage for oil leading therethru, a plug bearing against said slipper having a passage for oil in open communication with said passage in the slipper, a piston having an oil groove and a passage which communicates with said passage in the plug, and means for forcing oil thru said passages to said wobble-plate.

In testimony whereof I have affixed my signature.

LEONARD B. HARRIS.